(12) United States Patent
Su et al.

(10) Patent No.: US 7,817,740 B2
(45) Date of Patent: *Oct. 19, 2010

(54) METHOD AND SYSTEM FOR MINIMUM MEAN SQUARED ERROR SOFT INTERFERENCE CANCELLATION (MMSE-SIC) BASED SUBOPTIMAL MAXIMUM LIKELIHOOD (ML) DETECTION FOR MULTIPLE INPUT MULTIPLE OUTPUT (MIMO) WIRELESS SYSTEM

(75) Inventors: Ling Su, Cupertino, CA (US); George Kondylis, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1117 days.

This patent is subject to a terminal disclaimer.

(21) Appl. No.: 11/350,419

(22) Filed: Feb. 9, 2006

(65) Prior Publication Data

US 2007/0198719 A1    Aug. 23, 2007

(51) Int. Cl.
*H04L 5/12* (2006.01)

(52) U.S. Cl. .................. 375/262; 375/259; 375/260; 375/261; 375/263; 375/264; 714/792; 714/794; 714/795

(58) Field of Classification Search ......... 375/259–264; 714/792, 794, 795
See application file for complete search history.

(56) References Cited

U.S. PATENT DOCUMENTS

| 7,209,522 B1* | 4/2007 | Shirali ............... 375/285 |
| 2003/0076890 A1* | 4/2003 | Hochwald et al. ...... 375/264 |
| 2009/0154599 A1* | 6/2009 | Siti et al. ............. 375/320 |

\* cited by examiner

*Primary Examiner*—David C Payne
*Assistant Examiner*—Zewdu Kassa
(74) *Attorney, Agent, or Firm*—McAndrews, Held & Malloy

(57) ABSTRACT

Various aspects of a method for minimum mean square error soft interference cancellation (MMSE-SIC) based sub-optimal maximum likelihood (ML) detection for a multiple input multiple output (MIMO) wireless system may comprise selecting at least one constellation point in a constellation map based on at least one of a plurality of received symbols. A number of the at least one constellation point may be less than or equal to a number of previously selected constellation points in a previous constellation map. At least one of the plurality of received symbols may be decoded based on the selected at least one constellation point.

16 Claims, 7 Drawing Sheets

FIG. 4B

METHOD AND SYSTEM FOR MINIMUM MEAN SQUARED ERROR SOFT INTERFERENCE CANCELLATION (MMSE-SIC) BASED SUBOPTIMAL MAXIMUM LIKELIHOOD (ML) DETECTION FOR MULTIPLE INPUT MULTIPLE OUTPUT (MIMO) WIRELESS SYSTEM

CROSS-REFERENCE TO RELATED APPLICATIONS/INCORPORATION BY REFERENCE

Not Applicable.

FIELD OF THE INVENTION

Certain embodiments of the invention relate to wireless communications. More specifically, certain embodiments of the invention relate to a method and system for minimum mean squared error soft interference cancellation (MMSE-SIC) based suboptimal maximum likelihood (ML) detection for multiple input multiple output (MIMO) wireless systems.

BACKGROUND OF THE INVENTION

An RF communications system may comprise a transmitter and a receiver that communicate via a radio frequency (RF) channel. The transmitter may encode information in a symbol that is transmitted via the RF channel. The transmitter may utilize a modulation type to encode information into a symbol, s. The modulation type may comprise a plurality of constellation points that represent distinct combinations of binary bits. The transmitter may encode information comprising binary bits of information by selecting a modulation type, and within the selected modulation type, selecting a constellation point to represent the binary bits of information. A binary bit may also be referred to as a bit. The transmitter may generate signals corresponding to the constellation point that may comprise in-phase (I) and quadrature phase (Q) signals. The correlation between a constellation point and I and Q signals may comprise a mapping. The I and Q signals may be transmitted by the transmitter as an IQ signal via the RF channel.

The RF channel may distort the transmitted IQ signal from the transmitter such that, at the receiver, the received signals $I_R$ and $Q_R$ may differ in magnitude and/or phase from the corresponding transmitted signals I and Q. In addition, the RF channel may introduce noise into the signal.

A task for a receiver in achieving successful reception of information, via the RF channel, from the transmitter may comprise a plurality of steps to determine, based on a received $I_R Q_R$ signal, the binary bits, of information that were transmitted by the transmitter. One step may comprise detecting a symbol from the received $I_R Q_R$ signal. The receiver may utilize a modulation type to decode the $I_R Q_R$ signal. The receiver may utilize a corresponding modulation type to the modulation type utilized by the transmitter. The correlation between the signals $I_R$ and $Q_R$ and a constellation point may comprise a demapping. Because the signals $I_R$ and $Q_R$ at the receiver may differ from the corresponding signals I and Q at the transmitter, the receiver may be unable to correlate the signals $I_R$ and $Q_R$ to a constellation point. The receiver may utilize various heuristics to demap the signals $I_R$ and $Q_R$ to a constellation point. The selected constellation point may comprise an estimate, $\hat{s}$, of the symbol, s, that was transmitted by the transmitter.

Since the receiver utilizes an estimate of the transmitted signal, $\hat{s}$, there is a statistical probability that the constellation point associated with estimate $\hat{s}$ may differ from the corresponding constellation point associated with original symbol, s. Consequently, there is a statistical probability that at least one binary bit of information retrieved from the estimate, $\hat{s}$, may differ from a corresponding binary bit of information in the original symbol, s, that was transmitted by the transmitter. Such a difference in one or more received binary bits of information may constitute a communications error between the transmitter and the receiver that may be measured by a packet error rate (PER) statistic.

The task of assessing the statistical probability that at least one binary bit of information in an estimate, $\hat{s}$, is equivalent to a corresponding binary bit of information in an original symbol, s, may comprise comparing the estimate $\hat{s}$ to a plurality of constellation points in a constellation map. In some conventional approaches, the task of evaluating these comparisons may be of exponential complexity as the number of constellation points in a constellation map may increase exponentially with an increase in the number of binary bits contained in an original symbol, s. A comparison between the estimate $\hat{s}$ and at least one constellation point in a constellation map may be referred to as a "search". A comparison between the estimate $\hat{s}$ and each of the plurality of constellation points in a constellation map may be referred to as a "full search". The number of comparisons in a full search may increase exponentially with an increase in the number of bits contained in the original symbol, s.

A transmitter may also utilize a plurality of symbols to encode a plurality of binary bits of information. The transmitter may transmit the plurality of symbols concurrently. Each of the plurality of symbols may be transmitted by a corresponding plurality of transmitting antennas. Each of the plurality of symbols may be transmitted in a corresponding stream. The stream transmitted by each transmitting antenna may be referred to as a "layer". At the receiver, the received plurality of symbols may be compared to constellation points in a constellation map in which the number of comparisons may also increase exponentially with an increase in the number of symbols in the transmitted plurality of symbols. Alternatively, each symbol in the received plurality of symbols may be associated with a corresponding constellation map for the symbol. Within a layer, a symbol in a received plurality of symbols may be compared to constellation points in a constellation map. Jointly comparing each symbol in the received plurality of symbols to constellation points in each corresponding constellation map may still result in an exponential increase in the number of comparisons with an increase in the number of symbols in the transmitted plurality of symbols.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for minimum mean squared error soft interference cancellation (MMSE-SIC) based suboptimal maximum likelihood (ML) detection for multiple input multiple output (MIMO) wireless systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4B is a diagram illustrating an exemplary soft information calculation, in accordance with an embodiment of the invention.

DETAILED DESCRIPTION OF THE INVENTION

Certain embodiments of the invention may be found in a method and system for minimum mean squared error soft interference cancellation (MMSE-SIC) based suboptimal maximum likelihood (ML) detection for multiple input multiple output (MIMO) wireless systems. Various embodiments of the invention may utilize statistical analytical methods to reduce communications errors between a transmitter and a receiver communicating via an RF channel by improving the statistical likelihood that a received binary bit of information does not differ from the corresponding binary bit of information that was transmitted. Various aspects of a system for MMSE soft interference cancellation (MMSE-SIC) based on suboptimal ML detection for a multiple input multiple output (MIMO) wireless system may comprise utilizing log likelihood ratios (LLR) in a reduced complexity ML detector.

Various embodiments of the invention may achieve reduced complexity in comparison to alternative approaches to the task of ML detection. One aspect of the invention may reduce complexity by reducing the number of comparisons between a received plurality of symbols and constellation points in a constellation map. In relation to a full search method, various embodiments of the invention may compare a estimate ŝ, in a layer, to a number of constellation points in a corresponding constellation map where the number of comparisons may be less than the number of constellation points in the corresponding constellation map.

Figure 1:
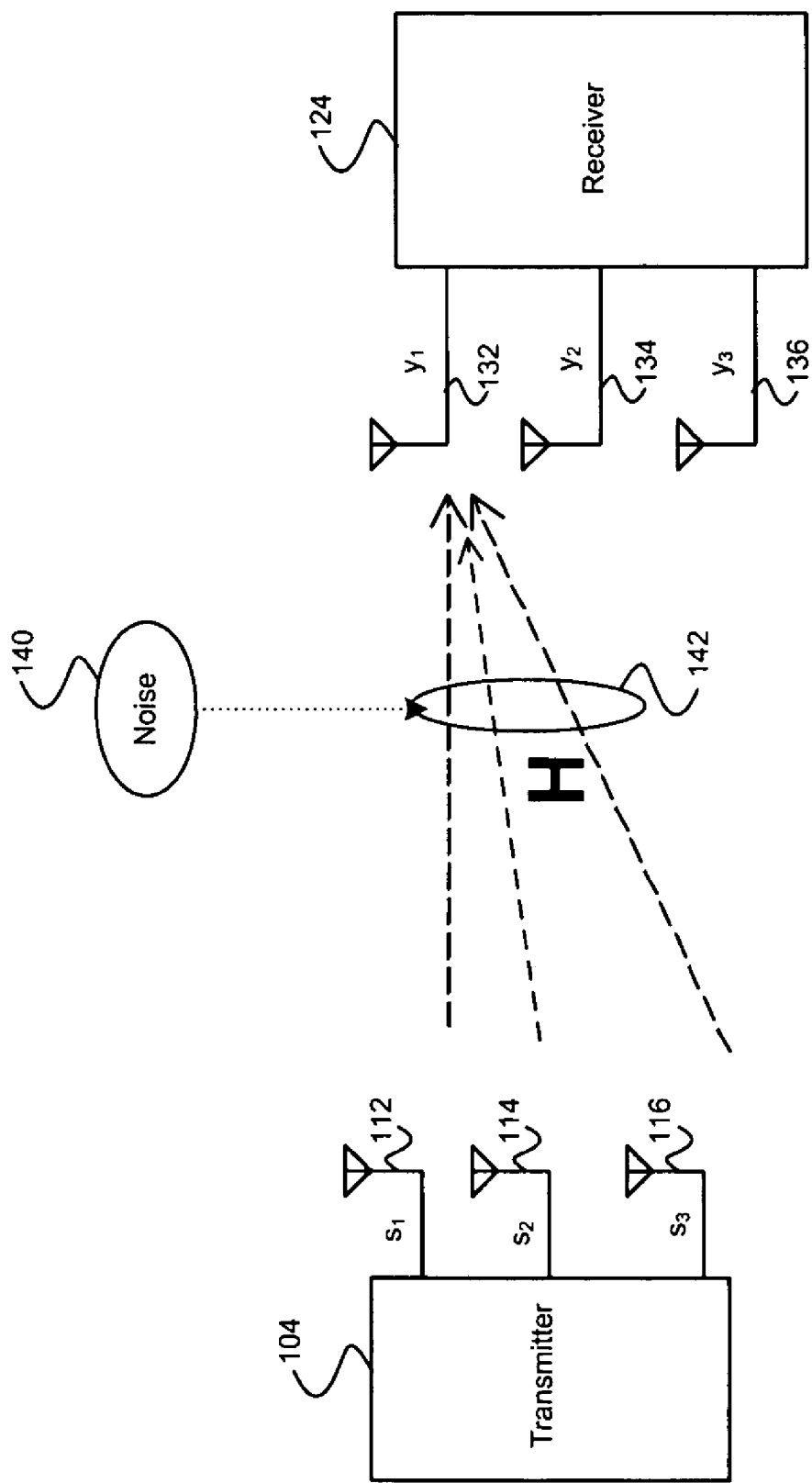
FIG. 1 is a block diagram illustrating an exemplary multiple input multiple output (MIMO) communications system that may be utilized in connection with an embodiment of the invention.

FIG. 1 is a block diagram illustrating an exemplary multiple input multiple output (MIMO) communications system that may be utilized in connection with an embodiment of the invention. Referring to FIG. 1 there is shown a transmitting mobile terminal 104, a plurality of transmitting antenna 112, 114, and 116, a receiving mobile terminal 124, a plurality of receiving antenna 132, 134, and 136, a plurality of RF channels 142, and a noise source 140.

In operation, the transmitter 104 may transmit signals via the plurality of transmitting antennas 112, 114, and 116. A signal may comprise a transmitted symbol. An independent signal transmitted by the plurality of transmitting antennas 112, 114, and 116 may represent a spatial stream. A signal transmitted by the transmitter 104 may be considered independent if it comprises information that is independent compared to another signal transmitted by the transmitter 104, during an approximately simultaneous period of time. For a given number, NTX, of transmitting antennas 112, 114, and 116, the number of spatial streams, NSS, transmitted by the transmitter 104 may be greater than or equal to 1, and less than or equal to NTX. If NSS is equal to NTX, then each of the plurality of transmitting antennas 112, 114, and 116 may transmit independent signals during an approximately simultaneous period of time.

The transmitter 104 may transmit a plurality of symbols $s_1$, $s_2$, and $s_3$, via corresponding transmitting antenna 112, 114, and 116 respectively. The symbols may be transmitted via an RF channel 142 where they may be subjected to scaling by a transfer function matrix, H, that is associated with transmission via the RF channel 142. A transfer function matrix of the RF channel 142, H, may be derived at the receiver 124 based on a channel estimate. Furthermore, noise from the noise source 140 may be added to the transmitted symbols. During communication with the transmitter 104, the receiver 124 may receive signals $y_1$, $y_2$, and $y_3$, via receiving antennas 132, 134, and 136 respectively, where at least one received signal comprises at least a portion of the symbols $s_1$, $s_2$, and $s_3$ that were transmitted by the transmitter 104. For example, given independent signals from the transmitting antennas 112, 114, and 116, the signal $y_1$ may be expressed:

$$y_1 = h_{11}x_1 + h_{12}x_2 + h_{13}x_3 + n_1 \qquad \text{equation[1]}$$

where $x_i$ may represent an estimate of the corresponding symbol $s_i$, $n_1$ may represent noise introduced into the RF channel 142 by a noise source 140, and $h_{ni}$ may represent a coefficient from the transfer function matrix H that is applied to a signal transmitted by transmitting antenna i, and received by receiving antenna n.

Equation[1] may be generalized to express a relationship between a plurality of signals, S, transmitted by a transmitter 104, and a signal, Y, comprising a plurality of signals received by a receiver 124:

$$Y = HX + N \qquad \text{equation[2]}$$

where $Y = \{y_1, y_2, \ldots y_{NRX}\}$ may be represented as an NRX×1 (NRX rows, 1 column) matrix with NRX representing a number of receiving antenna, $X = \{x_1, x_2, \ldots x_{NSS}\}$ may be represented as an NSS×1 matrix, H may be represented as a NRX× NTX matrix $\{\{h_{11}, h_{12}, \ldots h_{1,NTX}\}\{h_{21}, h_{22}, \ldots h_{2,NTX}\}\{h_{NRX,1}, h_{32}, h_{NRX,NTX}\}\}$; and the noise vector N may be represented as is a NRX×1 matrix $\{n_1, n_2, \ldots n_{NRX}\}$.

An estimate for the vector X from equation[2] may be computed based on the received signal vector Y as shown in the following equation:

$$X = WY \qquad \text{equation[3]}$$

where W may represent a matrix.

The matrix W from equation[3] may be computed by a linear equalization method. When utilizing zero forcing linear equalization (ZF-LE), the matrix W may be computed based on the transfer function matrix H as shown in the following equation:

$$W = \frac{1}{H^*H} H^* \qquad \text{equation [4]}$$

where H* may represent a complex conjugate transpose of the matrix H.

When utilizing minimum mean squared error linear equalization (MMSE-LE), the matrix W may be computed based on the transfer function matrix H, and a signal to noise ratio (SNR) based on the received signal vector Y and noise vector N, as shown in the following equation:

$$W = \frac{1}{\left(H^*H + \frac{1}{SNR}I\right)} H^* \qquad \text{equation [5]}$$

where I may represent an identity matrix.

In the exemplary MIMO communications system illustrated in FIG. 1, the plurality of received signals received by receiver 124 may comprise $Y=\{y_1, y_2, y_3\}$, the plurality of signals transmitted by transmitter 104 may comprise $S=\{s_1, s_2, s_3\}$, the transfer function matrix of the RF channel 142 may comprise $H=\{\{h_{11}, h_{12}, h_{13}\}\{h_{21}, h_{22}, h_{23}\}\{h_{31}, h_{32}, h_{33}\}\}$; and the noise source 140 may comprise $N=\{n_1, n_2, n_3\}$.

A receiver 124 may utilize maximum likelihood (ML) detection to determine a likelihood that the binary value of a received bit, x, decoded from an estimated symbol, ŝ, that was derived from a received signal, Y, is equal to the binary value of a corresponding bit in a symbol, s, that was transmitted by a transmitter 104. For example, based on a log likelihood ratio (LLR) analysis, a likelihood that the value of an $i^{th}$ bit, in a symbol transmitted by an $n^{th}$ transmitting antenna 112, given received signal Y at the receiver 124, is equal to binary 1, or an L-value of a bit $x_{ni}$, $L(X_{ni}|Y)$, may be expressed as:

$$L(x_{ni} | Y) = \ln\left(\frac{P(x_{ni} = 1 | Y)}{P(x_{ni} = 0 | Y)}\right) \qquad \text{equation [6]}$$

where $x_{ni}$ may represent an $i^{th}$ bit, in a symbol transmitted by an $n^{th}$ transmitting antenna 112. The probabilities $P(x_{ni}=1|Y)$, and $P(x_{ni}=0|Y)$, may represent the a priori probabilities that $x_{ni}$ equals 1 and 0 respectively, given a received signal Y.

Applying Bayes' rule, equation[6] may also be expressed as:

$$L(x_{ni} | Y) = \ln\left(\frac{P(Y | x_{ni} = 1)P(x_{ni} = 1)/p(Y)}{P(Y | x_{ni} = 0)P(x_{ni} = 0)/p(Y)}\right) \qquad \text{equation [7]}$$

where the probabilities $p(Y|x_{ni}=1)$, and $p(Y|x_{ni}=0)$, may represent the probabilities that a received signal Y was accurately received by the receiver 124 given that bit $x_{ni}$ equals 1 and 0 respectively. The probabilities $P(x_{ni}=1)$, and $P(x_{ni}=0)$, may represent the a priori probabilities that bit $x_{ni}$ equals 1 and 0 respectively. The probability $p(Y)$ may represent the probability of receiving signal Y.

Accordingly, equation[7] may further be expressed:

$$L(x_{ni} | Y) = \ln\left(\frac{P(x_{ni} = 1)}{P(x_{ni} = 0)}\right) + \ln\left(\frac{P(Y | x_{ni} = 1)}{P(Y | x_{ni} = 0)}\right) \qquad \text{equation [8]}$$

where the first term on the right hand side of equation[8] may represent an a priori L-value of a bit $x_{ni}$, or $L_{A,ni}$, and the second term on the right hand side of equation[8] may represent an expectation value for the probability p(Y|x) over a range of values of $x_{ni}$ which may be selected from among a range of values comprising $\{x_{ni}=1, x_{ni}=0\}$.

The second term on the right hand side of equation[8] may be evaluated by considering a range of possible combinations of binary bits in a received signal Y. For a received signal Y comprising a plurality of D binary bits, there may $2^D$ possible combinations of binary bits in the signal Y. The plurality of D binary bits may be represented as X. The probability $p(Y|x_{ni}=1)$ in equation[8] may represent a number of possible combinations of binary bits in the received signal Y for which $x_{ni}=1$. The probability $p(Y|x_{ni}=0)$ in equation[8] may represent a number of possible combinations of binary bits in the received signal Y for which $x_{ni}=0$. Given this, equation[8] may be expressed:

$$L(x_{ni} | Y) = L_{A,ni} + \ln\left(\frac{\sum_{x_{ni}=1} p(Y | X)P(X | x_{ni})}{\sum_{x_{ni}=0} p(Y | X)P(X | x_{ni})}\right) \qquad \text{equation [9]}$$

Lacking any a priori basis to expect that the probability that $x_{ni}=1$ is not equal to the probability that $x_{ni}=0$, the first term of equation[9] may be equal to 0. Furthermore, a Max-Log approximation may be applied to simplify equation[9]:

$$L(x_{ni} | Y) \approx \max_{x_{ni}=1}\{\ln p(Y | X) + \ln P(X | x_{ni})\} - \qquad \text{equation [10]}$$
$$\max_{x_{ni}=0}\{\ln p(Y | X) + \ln P(X | x_{ni})\}$$

where the first term on the right hand side of equation[10] may represent a statistically most probable, or most likely, combination of binary bits in the received signal Y for which a bit $x_{ni}$ in that combination is equal to a binary value of 1. The natural logarithm of the probability of a most likely combination may be represented as $\Lambda(X,Y)$. The second term on the right hand side of equation[10] may represent a statistically most probable, or most likely, combination of binary bits in the received signal Y for which a bit $x_{ni}$ in that combination is equal to a binary value of 0.

Based on equation[10], an a posteriori L-value may be expressed:

$$L(x_{ni} | Y) \approx \max_{x_{ni}=1}\Lambda(X, Y) - \max_{x_{ni}=0}\Lambda(X, Y) \qquad \text{equation [11]}$$

Based on an additive Gaussian white noise (AWGN) distribution for probabilities associated with the received signal Y in equation[2]:

$$p(Y\mid X) = \frac{1}{\sqrt{2\pi}\,N_0} e^{-\frac{\|Y-Hs(x)\|^2}{2N_0}} \qquad \text{equation [12]}$$

where $N_0$ may represent a variance of noise introduced by a noise source 140, s(x) may represent a constellation point, and x may represent binary bits that may be demapped from the constellation point s(x). The expression $\|A\|$ may represent a scalar magnitude of a vector A.

Thus, $\Lambda(X,Y)$ may be expressed as:

$$\Lambda(X, Y) = -\frac{1}{N_0}\|Y - Hs(x)\|^2 \qquad \text{equation [13]}$$

Substituting the expression for $\Lambda(X,Y)$ from equation[13] into equation[11] may produce:

$$L(x_{ni}\mid Y) = \max_{x_{ni}=1}\{-\|Y - Hs(x)\|^2\} - \max_{x_{ni}=0}\{-\|Y - Hs(x)\|^2\} \qquad \text{equation [14]}$$

that may be further expressed:

$$L(x_{ni}\mid Y) = \min_{x_{ni}=0}\{\|Y - Hs(x)\|^2\} - \min_{x_{ni}=1}\{\|Y - Hs(x)\|^2\} \qquad \text{equation [15]}$$

The first term on the right hand side of equation[15] may represent a minimum mean squared error for a most likely combination of bits X comprising $x_{ni}=0$. The second term on the right hand side of equation[15] may represent a magnitude minimum mean squared error (MMSE) for a most likely combination of bits X comprising $x_{ni}=1$. As such, an L-value based on equation[15] expresses a difference between magnitude MMSEs. A magnitude MMSE may also be referred to as a magnitude, or as an MMSE. If the magnitude MMSE for a desired outcome, for example $x_{ni}=1$, is significantly less than the magnitude MMSE for an undesired outcome, for example $x_{ni}=0$, the L-value may be large. A large L-value may reflect a higher degree of statistical confidence, which indicates that a detected bit $x_{ni}=1$ at the receiver 124 actually is a value for a corresponding bit transmitted by the transmitter 104. An L-value generated by a detector may comprise soft information that may be utilized by a decoder to decode at least one binary bit derived from an estimated symbol $\hat{s}$.

In a signal Y associated with independent signals, or layers, $x_1, x_2, \ldots x_{NSS}$, ZF-LE may be based on cancelling interference associated with a layer $x_i$, from the signal Y by projecting a desired signal $x_j$ in a vector subspace that may be perpendicular to the signal $x_i$. One potential limitation associated with this method is that ZF-LE may result in a loss of useful signal energy which may, in turn, result in noise enhancement. This may result in reduced SNR. MMSE-LE may utilize a minimum mean squared error criteria but may result in an increased packet error rate (PER).

By comparison, maximum likelihood (ML) equalization may represent a more optimal solution but may be comparatively very complex. An ML equalization implementation may involve a search through a plurality of all candidate vectors contained in a multiple-dimension space. The size of the multiple-dimension space may be determined based on the number of layers, and the modulation type utilized with each layer. Consequently, the complexity of the ML equalization implementation may increase exponentially based on the number of layers and the number of points in a constellation associated with the corresponding modulation type utilized with each layer.

Figure 2:
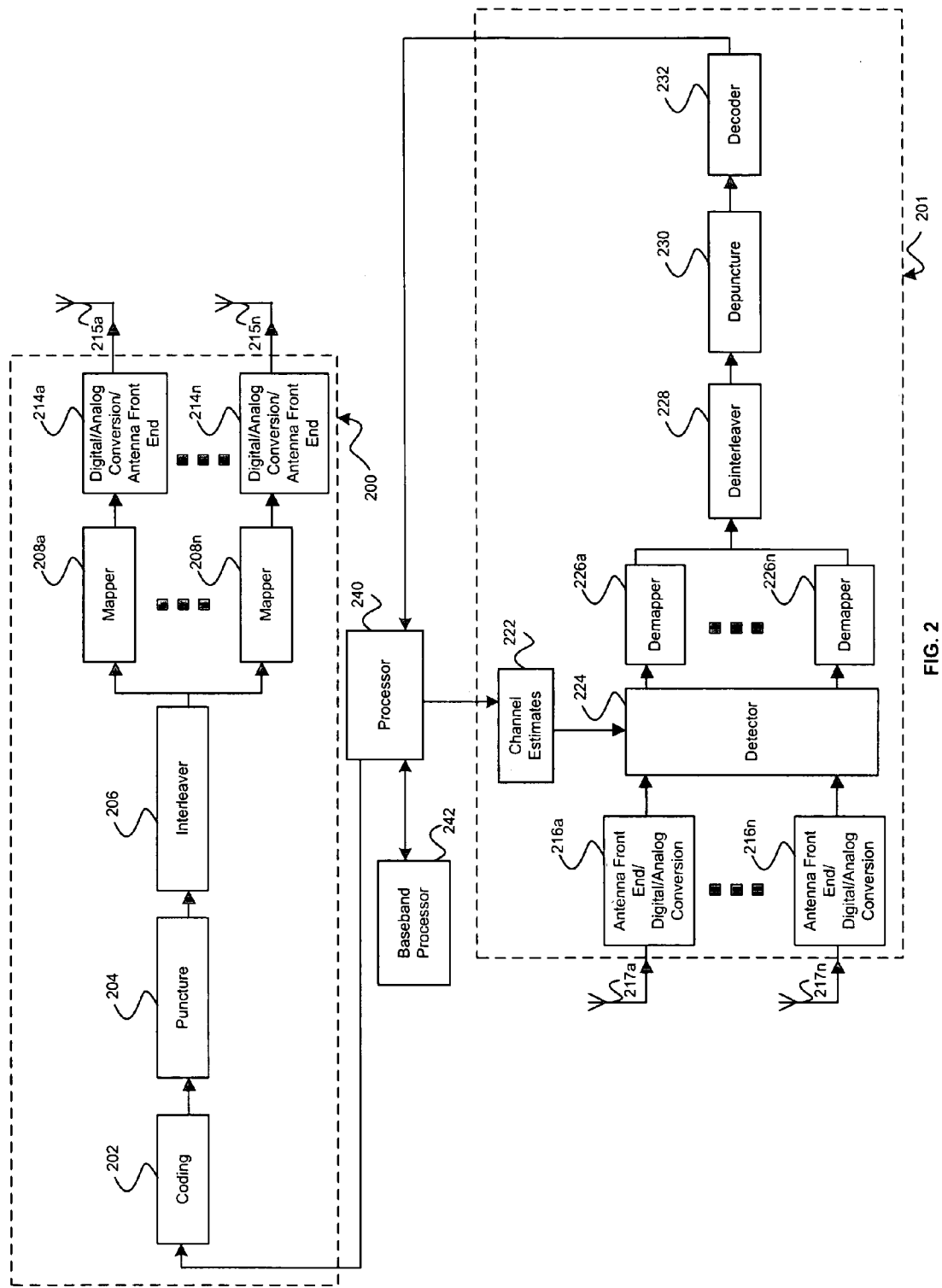
FIG. 2 is a block diagram of an exemplary MIMO transceiver system in accordance with an embodiment of the invention.

FIG. 2 is a block diagram of an exemplary MIMO transceiver system in accordance with an embodiment of the invention. Referring to FIG. 2 there is shown a transceiver comprising a transmitter 200, a receiver 201, a processor 240, a baseband processor 242, a plurality of transmitting antennas 215a . . . 215n, and a plurality of receiving antennas 217a . . . 217n. The transmitter 200 may comprise a coding block 202, a puncture block 204, an interleaver block 206, a plurality of mapper blocks 208a . . . 208n, and a plurality of digital to analog (D to A) conversion and antenna front end blocks 214a . . . 214n. The receiver 201 may comprise a plurality of antenna front end and analog to digital (A to D) conversion blocks 216a . . . 216n, a detector block 224, a plurality of demapper blocks 226a . . . 226n, a deinterleaver block 228, a depuncture block 230, and a decoder block 232.

The processor 240 may perform upper layer protocol functions in accordance with applicable communications standards. These functions may comprise, but are not limited to, tasks performed at lower layers in a relevant protocol reference model. These tasks may further comprise physical layer convergence procedure (PLCP), physical medium dependent (PMD) functions, and associated layer management functions. The baseband processor 242 may perform lower layer protocol functions in accordance with applicable communications standards. These functions may comprise, but are not limited to, tasks related to analysis of data received by the receiver 201, and tasks related to generating data to be transmitted by the transmitter 200. These tasks may further comprise medium access control (MAC) layer functions as specified by pertinent standards.

In the transmitter 200, the coding block 202 may transform received binary input data blocks by applying a forward error correction (FEC) technique, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in a binary input data block to the number of bits in a transformed data block may be known as the "coding rate". The coding rate may be specified using the notation $i_b/t_b$, where $t_b$ represents the total number of bits that may comprise a coding group of bits, while $i_b$ represents the number of information bits that may be contained in the group of bits $t_b$. Any number of bits $t_b - i_b$ may represent redundant bits that may enable the receiver 201 to detect and correct errors introduced during transmission. Increasing the number of redundant bits may enable greater capabilities at the receiver to detect and correct errors in information bits. The invention is not limited to BCC, and any one of a plurality of coding techniques, for example, Turbo coding or low density parity check (LDPC) coding, may also be utilized.

The puncture block 204 may receive transformed binary input data blocks from the coding block 202 and alter the coding rate by removing redundant bits from the received transformed binary input data blocks. For example, if the coding block 202 implemented a ½ coding rate, 4 bits of data received from the coding block 202 may comprise 2 information bits, and 2 redundant bits. By eliminating 1 of the redundant bits in the group of 4 bits, the puncture block 204 may adapt the coding rate from ½ to ⅔. The interleaver block 206 may rearrange bits received in a coding rate-adapted data block from the puncture block 204 prior to transmission via an RF channel to reduce the probability of uncorrectable corruption of data due to burst of errors, impacting contiguous bits, during transmission via an RF channel. The output from the interleaver block 206 may also be divided into a plurality of streams where each stream may comprise a non-overlapping portion of the bits from the received coding rate-adapted data block. Therefore, for a given number of bits in the coding rate-adapted data block, $b_{db}$, a given number of streams from the interleaver block 206, $n_{st}$, and a given number of bits assigned to an individual stream i by the interleaver block 206, $b_{st}(i)$:

$$b_{db} = \sum_{i=0}^{n_{st}-1} b_{st}(i) \qquad \text{equation [16]}$$

For a given number of coded bits before interleaving, $b_{db}$, each bit may be denoted by an index, k=0, 1 ... $b_{db}$−1. The interleaver block 206 may assign bits to the first spatial stream, spatial stream 0, $b_{st}(0)$, for bit indexes k=0, $n_{st}$, 2*$n_{st}$, ..., $b_{db}$−$n_{st}$. The interleaver block 206 may assign bits to spatial stream 1, $b_{st}(1)$, for bit indexes k=1, $n_{st}$+1, 2*$n_{st}$+1, ..., $b_{db}$−$n_{st}$+1. The interleaver block 206 may assign bits to spatial stream 2, $b_{st}(2)$, for bit indexes k=2, $n_{st}$+2, 2*$n_{st}$+2, ..., $b_{db}$−$n_{st}$+2. The interleaver block 206 may assign bits to spatial stream $n_{st}$, $b_{st}(n_{st})$, for bit indexes k=$n_{st}$−1, 2*$n_{st}$−1, 3*$n_{st}$−1, ..., $b_{db}$−1.

The plurality of mapper blocks 208a ... 208n may comprise a number of individual mapper blocks that is equal to the number of individual streams generated by the interleaver block 206. Each individual mapper block 208a ... 208n may receive a plurality of bits from a corresponding individual stream, mapping those bits into a "symbol" by applying a modulation technique based on a "constellation" utilized to transform the plurality of bits into a signal level representing the symbol. The representation of the symbol may be a complex quantity comprising in-phase (I) and quadrature (Q) components. The mapper block 208a ... 208n for stream i may utilize a modulation technique to map a plurality of bits, $b_{st}(i)$, into a symbol.

The plurality of digital (D) to analog (A) conversion and antenna front end blocks 214a ... 214n may receive the plurality of signals generated by the plurality of mapper blocks 208a ... 208n. The digital signal representation received from each of the plurality of mapper blocks 208a ... 208n may be converted to an analog RF signal that may be amplified and transmitted via an antenna. The plurality of D to A conversion and antenna front end blocks 214a ... 214n may be equal to the number of transmitting antenna 215a ... 215n. Each D to A conversion and antenna front end block 214a ... 214n may utilize an antenna 215a ... 215n to transmit one RF signal via an RF channel.

In the receiver 201, the plurality of antenna front end and A to D conversion blocks 216a ... 216n may receive analog RF signals via an antenna, converting the RF signal to baseband and generating a digital equivalent of the received analog baseband signal. The digital representation may be a complex quantity comprising I and Q components. The number of antenna front end and A to D conversion blocks 216a ... 216n may be equal to the number of receiving antenna 217a ... 217n.

The channel estimates block 222 may utilize preamble information, contained in a received RF signal, to compute channel estimates. The detector block 224 may receive signals generated by the plurality of antenna front end blocks 216a ... 216n. The detector block 224 may process the received signals based on input from the channel estimates block 222 to recover the symbol originally generated by the transmitter 200 the detector block 224 may comprise suitable logic, circuitry, and/or code that may be adapted to transform symbols received from the plurality of antenna front end blocks 216a ... 216n to compensate for fading in the RF channel.

The plurality of demapper blocks 226a ... 226n may receive symbols from the detector block 224, reverse mapping each symbol to one or more binary bits by applying a demodulation technique, based on the modulation technique utilized in generating the symbol at the transmitter 200. The plurality of demapper blocks 226a ... 226n may be equal to the number of streams in the transmitter 200.

The deinterleaver block 228 may receive a plurality of bits from each of the demapper blocks 226a ... 226n, rearranging the order of bits among the received plurality of bits. The deinterleaver block 228 may rearrange the order of bits from the plurality of demapper blocks 226a ... 226n in, for example, the reverse order of that utilized by the interleaver 206 in the transmitter 200. The depuncture block 230 may insert "null" bits into the output data block received from the deinterleaver block 228 that were removed by the puncture block 204. The decoder block 232 may decode a depunctured output data block, applying a decoding technique that may recover the binary data blocks that were input to the coding block 202.

In operation, the detector 224 may perform statistical analysis on a received symbol. The received symbol may be estimated and mapped to a plurality of candidate constellation points in a constellation based on a modulation type. The plurality of candidate constellation points may comprise a subset of the total number of constellation points in the constellation. Based on the statistical analysis, the detector 224 may generate soft information. The decoder 232 may utilize the soft information in decoding a plurality of binary bits received from the depuncture block 230. The decoder may determine a binary value for at least one of the plurality of binary bits received from the depuncture block 230.

The processor 240 may receive decoded data from the decoder 232. The processor 240 may communicate received data to the baseband processor 242 for analysis and further processing. The processor 240 may also communicate data received via the RF channel, by the receiver 201, to the channel estimates block 222. This information may be utilized by the channel estimates block 222, in the receiver 201, to compute channel estimates for a received RF channel. The baseband processor 242 may generate data to be transmitted via an RF channel by the transmitter 200. The baseband processor 242 may communicate the data to the processor 240. The processor 240 may generate a plurality of bits that are communicated to the coding block 202.

The elements shown in FIG. 2 may comprise components that may be present in an exemplary embodiment of a wireless communications terminal. One exemplary embodiment may be a wireless communications transmitter comprising a transmitter 200, a processor 240, and a baseband processor 242. Another exemplary embodiment may be a wireless communications receiver comprising a receiver 201, a processor 240, and a baseband processor 242. Another exemplary embodiment may be a wireless communications transceiver comprising a transmitter 200, a receiver 201, a processor 240, and a baseband processor 242.

In an ML implementation, an LLR may be computed as described in equation[15] for each of a plurality of candidate vectors. Each vector may comprise a plurality of symbols. Each symbol may comprise a plurality of bits. The total number of candidate vectors, L, may increase exponentially with the number of layers, or spatial steams, and with the number of constellation points associated with the modulation type utilized with each corresponding spatial stream as described in the following equation:

$$L = \prod_{i=1}^{NSS} M[i] \qquad \text{equation [17]}$$

where M[i] may represent the number of constellation points associated with the modulation type utilized with the $i^{th}$ spatial stream.

Various embodiments of the invention may represent a reduced complexity ML implementation that computes an LLR for each of a plurality of candidate vectors L', where the number of candidate vectors L' is less than the total number of candidate vectors L. The plurality of candidate vectors L' may be selected based on a magnitude error value, ||Y−HX||, where Y may represent a received signal vector, H may represent a transfer function matrix, and X may represent a vector of estimates for individual transmitted signals. Minimum mean squared error with soft interference cancellation (MMSE-SIC) may represent a method for selecting the set of candidate vectors L', in accordance with an embodiment of the invention.

ZF-LE is an example of a method for performing cancellation of a layer i from the signal vector Y by cancelling an estimate for a symbol $x_i$. The residual signal vector Y' may be utilized, in conjunction with a recomputed channel estimate matrix H', to compute a new estimate of the symbol vector X'. This process may be repeated for each of the subsequent layers among the plurality of NSS layers. If the estimated value for a layer $x_i$ is not equal to the value of the corresponding transmitted symbol $s_i$, the value $x_i$ may considered to be detected in error. If the erroneous value $x_i$ is utilized for cancellation of a layer, it may result in a propagation of that error when utilizing the corresponding residual values when estimating subsequent layers.

In various embodiments of the invention, a plurality of candidate symbol values, cp[i], may be selected for a layer i. The number of candidate symbol values cp[i] is less than the total number of constellation points associated with the layer. The first of the candidate symbol values may be selected, for example, corresponding to a candidate symbol value associated with the first layer. The value of the first candidate symbol may be cancelled from cancelled from the vector Y. A residual value may be stored. A subsequent candidate symbol value may be selected corresponding to the $j^{th}$ candidate symbol associated with the first layer. The value of the subsequent candidate symbol may be cancelled from the vector Y. A subsequent residual value may be stored.

After computing a residual value for each of the plurality of cp[i] candidate symbols associated with the first layer, each of the plurality of cp[i] residual values may be utilized to repeat the procedure for the $(i+1)^{th}$ layer. The total number of candidate vectors may be represented according to the following equation:

$$L' = \prod_{i=1}^{NSS} cp[i] \qquad \text{equation [18]}$$

where M[i]>cp[i] for at least a portion of the values i within the range of values 1, 2, . . . , NSS. Correspondingly, L>L'. For each of the candidate vectors L' soft information may be computed as described in equation[15].

Figure 3:
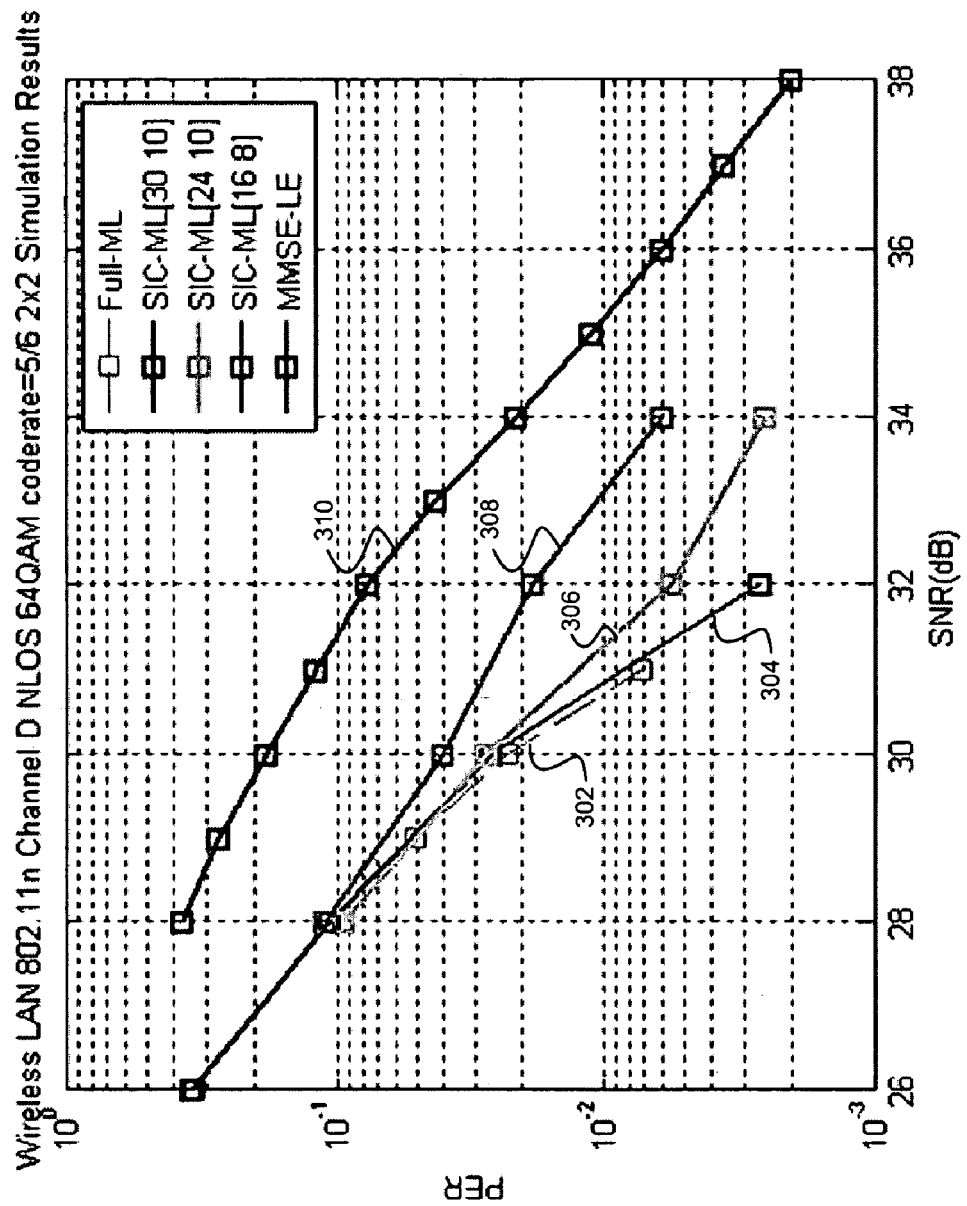
FIG. 3 is a graph illustrating exemplary results from simulation of a system for minimum mean squared error with soft interference cancellation (MMSE-SIC) based on suboptimal maximum likelihood (ML) detection for a MIMO-OFDM wireless system, in accordance with an embodiment of the invention.

FIG. 3 is a graph illustrating exemplary results from simulation of a system for minimum mean squared error with soft interference cancellation (MMSE-SIC) based on suboptimal maximum likelihood (ML) detection for a MIMO-OFDM wireless system, in accordance with an embodiment of the invention. Referring to FIG. 3 there is shown a graph based on a full-ML 302, a graph based on a SIC-ML[30, 10] 304, a graph based on a SIC-ML[24, 10] 306, a graph based on a SIC-ML[16, 8] 308, and a graph based on MMSE-LE 310.

The graphs 302, 304, 306, 308, and 310 in FIG. 3 may represent simulation results illustrating packet error rates (PER) at various signal to noise ratio (SNR) levels in an 802.11n wireless local area network (WLAN) MIMO communications system comprising a transmitter 104 (FIG. 1) that utilizes 2 transmitting antennas, and a receiver 124 that utilizes 2 receiving antennas. The system may comprise 2 spatial streams, utilizing the 64 quadrature amplitude modulation (QAM) modulation type for each spatial stream, and utilizes a coding rate of ⅚. The graph 302 may represent results from a full-ML system. A full-ML detector may comprise a ML detector that generates a number of error vectors equal to a number of constellation points in a constellation map for a received signal comprising a plurality of spatial streams. In the context of FIG. 3, this may comprise generation of approximately 4,096 error vectors. The graph 304 may represent an embodiment of the invention in which 30 error vectors may be generated in a first spatial stream, with 10 error vectors generated in a second spatial stream for each error vector generated in the first spatial stream. The conditions specified for graph 304 may result in the generation of approximately 300 error vectors. The PER versus SNR performance of an exemplary SIC-ML[30, 10] system may be approximately equivalent to that of an exemplary full-ML system.

The graph 306 may represent an embodiment of the invention in which 24 error vectors may be generated in a first spatial stream, with 10 error vectors generated in a second spatial stream for each error vector generated in the first spatial stream. The conditions specified for graph 306 may result in the generation of approximately 240 error vectors. The PER versus SNR performance of an exemplary SIC-ML[24, 10] system may be such that an exemplary SIC-ML[30, 10] system may maintain a PER of 0.01, or the equivalent of a 1% PER, at a SNR of approximately 0.25 dB lower than that of the exemplary SIC-ML[24, 10] system.

The graph 308 may represent an embodiment of the invention in which 16 error vectors may be generated in a first spatial stream, with 8 error vectors generated in a second spatial stream for each error vector generated in the first spatial stream. The conditions specified for graph 308 may result in the generation of approximately 128 error vectors. The PER versus SNR performance of an exemplary SIC-ML[16, 8] system may be such that an exemplary SIC-ML[30, 10] system may maintain a PER of 0.01, or the equivalent of a 1% PER, at a SNR of approximately 2 dB lower than that of the exemplary SIC-ML[16, 8] system.

The graph 310 may represent results from a MMSE-LE system that may not utilize ML detection. The PER versus SNR performance of an exemplary MMSE-LE system may be such that an exemplary SIC-ML[30, 10] system may maintain a PER of 0.01, or the equivalent of a 1% PER, at a SNR of approximately 4 dB lower than that of the exemplary MMSE-LE system.

Figure 4A:
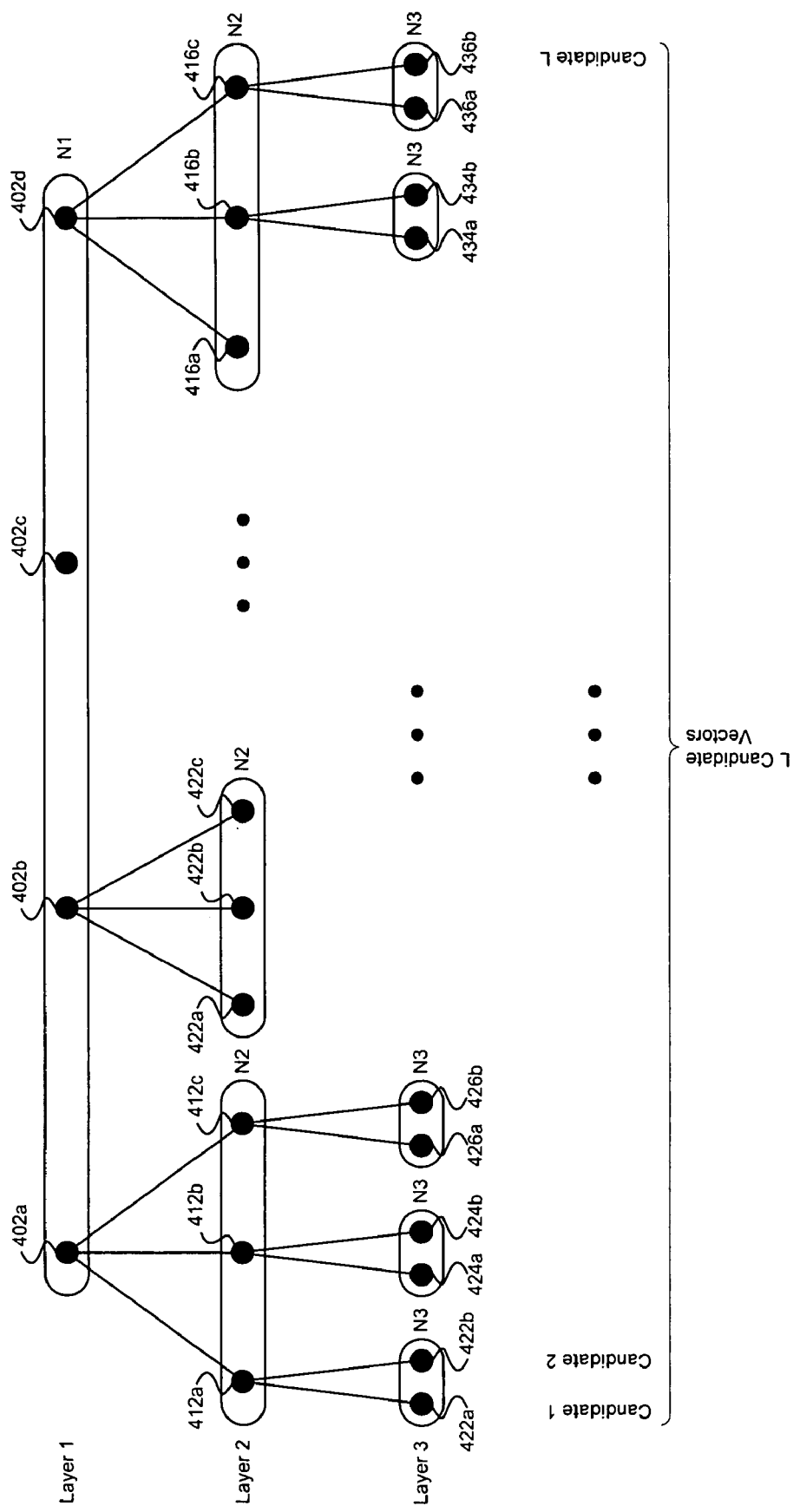
FIG. 4A is a diagram illustrating an exemplary method for soft information calculation, in accordance with an embodiment of the invention.

FIG. 4A is a diagram illustrating an exemplary method for soft information calculation, in accordance with an embodiment of the invention. Referring to FIG. 4A, there is shown a plurality of N1 points associated with layer 1 comprising 402a, 402b, 402c and 402d, a plurality of N1*N2 points associated with layer 2 comprising 412a, 412b, 412c, 414a, 414b, 414c, and a plurality of N1*N2*N3 points associated with layer 3 comprising 422a, 422b, 424a, 424b, 426a, 426b, 432a, 432b, 434a, 434b, 436a, and 436b. The number of points N1*N2*N3 may comprise a plurality of L candidate vectors that may be utilized to calculate soft information. The set of candidate vectors may be denoted by the variable C. Each of the points may represent a value for a symbol. For each point in layer 1, there may be plurality of N2 points in layer 2, for example associated with point 402a in layer 1 may be points 412a, 412b, and 412c in layer 2. For each point in layer 2, there may be N3 points in layer 3, for example associated with point 412a in layer 2 may be points 422a, and 422b in layer 3. A group of points spanning the layers 1, 2 and 3 may comprise a candidate vector, for example the points 402a, 412a, and 422a. In various embodiments of the invention, a metric, $M=\|Y-Hs\|$ may be computed for each candidate vector contained in the set C. The L candidate vectors may be sorted in increasing order, for example, based on the metric M.

Figure 4B:
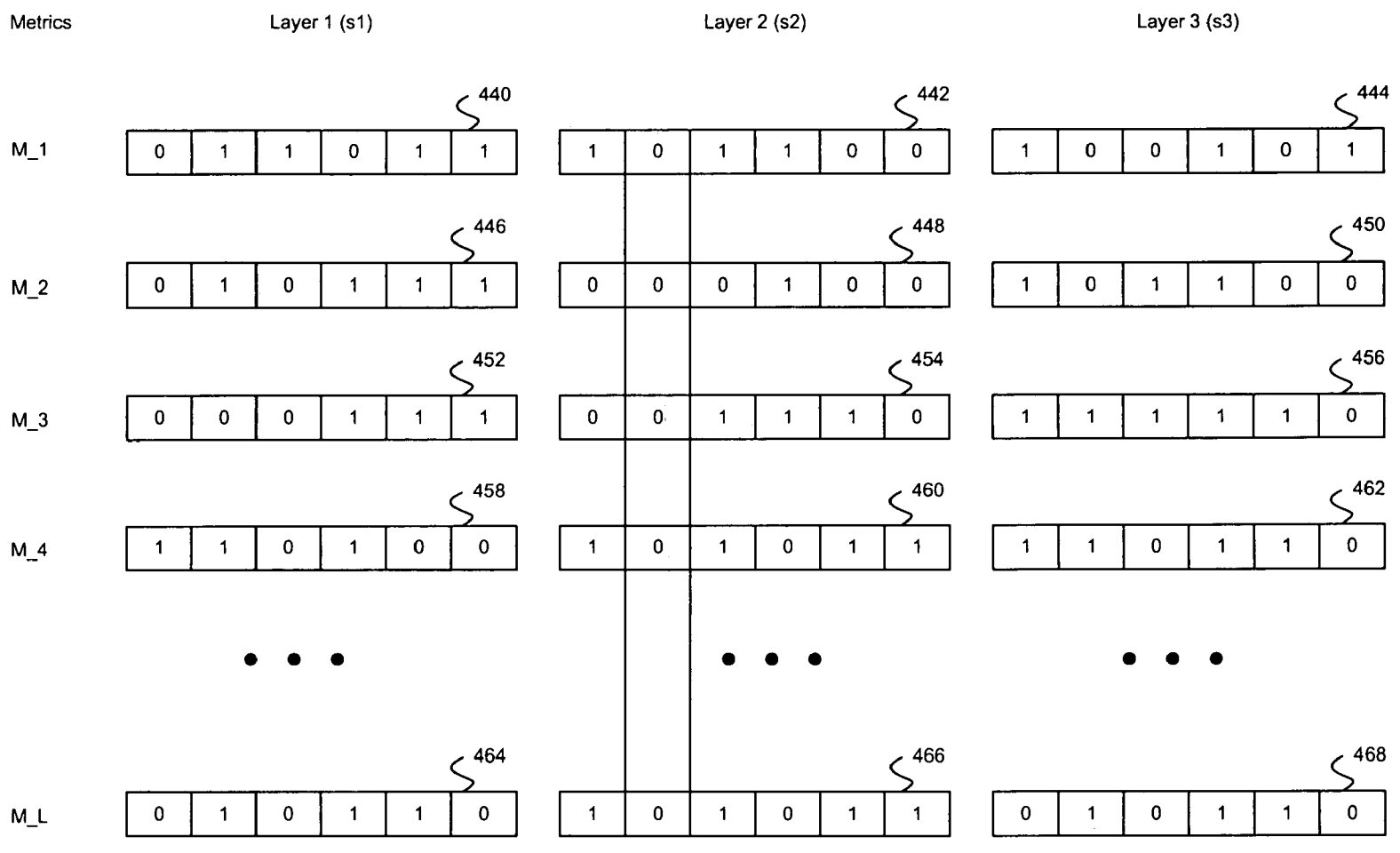

FIG. 4B is a diagram illustrating an exemplary soft information calculation, in accordance with an embodiment of the invention. Referring to FIG. 4B there is shown a plurality of symbols 440, 442, 444, 446, 448, 450, 452, 454, 456, 458, 460, 462, 464, 466, and 468. In the example illustrated in FIG. 4B, there are 3 layers. 64-point quadrature amplitude modulation (64 QAM) is utilized for each layer. Consequently, each symbol comprises 6 bits, and each candidate vector comprises 18 bits. Thus, soft information may be computed for each of the 18 bits for each of the L candidate vectors. A metric, M_q may be computed for each of the L candidate vectors as indicated by q, where q may be set to a value among the range 1, 2, . . . , L. For example, a metric M_1 may be computed for the first candidate vector.

Symbols 440, 442, and 444 may represent symbols associated with candidate vector 1. Symbols 446, 448, and 450 may represent symbols associated with candidate vector 2. Symbols 452, 454, and 456 may represent symbols associated with candidate vector 3. Symbols 458, 460, and 462 may represent symbols associated with candidate vector 4. Symbols 464, 466, and 468 may represent symbols associated with candidate vector L.

Symbols 440, 446, 452, 458 and 464 may represent symbols, s1, associated with layer 1. Symbols 442, 448, 454, 460 and 466 may represent symbols, s2, associated with layer 2. Symbols 444, 450, 456, 462 and 468 may represent symbols, s3, associated with layer 3.

Equation[15] may be utilized to compute an LLR for the most significant bit (MSB) associated with layer 1. In candidate vector 1, the binary value of the MSB in the symbol 440 may be 0. The corresponding metric may be M_1. In candidate vector 4, the binary value of the MSB in the symbol 458 may be 1. The corresponding metric may be M_4. The soft information associated with the MSB of symbol s1, may be computed from the LLR where LLR=(M_1−M_4).

Since, in various embodiments of the invention, the L candidates may represent a subset of the full combination of candidate vectors, it is possible for an $m^{th}$ MSB associated with a $p^{th}$ symbol to have a binary value of 0, or a binary value of 1, in each of the L candidate vectors. As highlighted in the example illustrated in FIG. 4B, the second MSB associated with the second symbol, 442, 448, 454, 460 and 466, is equal to a binary value of 0 in each of the L candidate vectors. In such cases, the LLR may be approximated LLR=(M_1+K), where K may represent a positive value.

Figure 5:
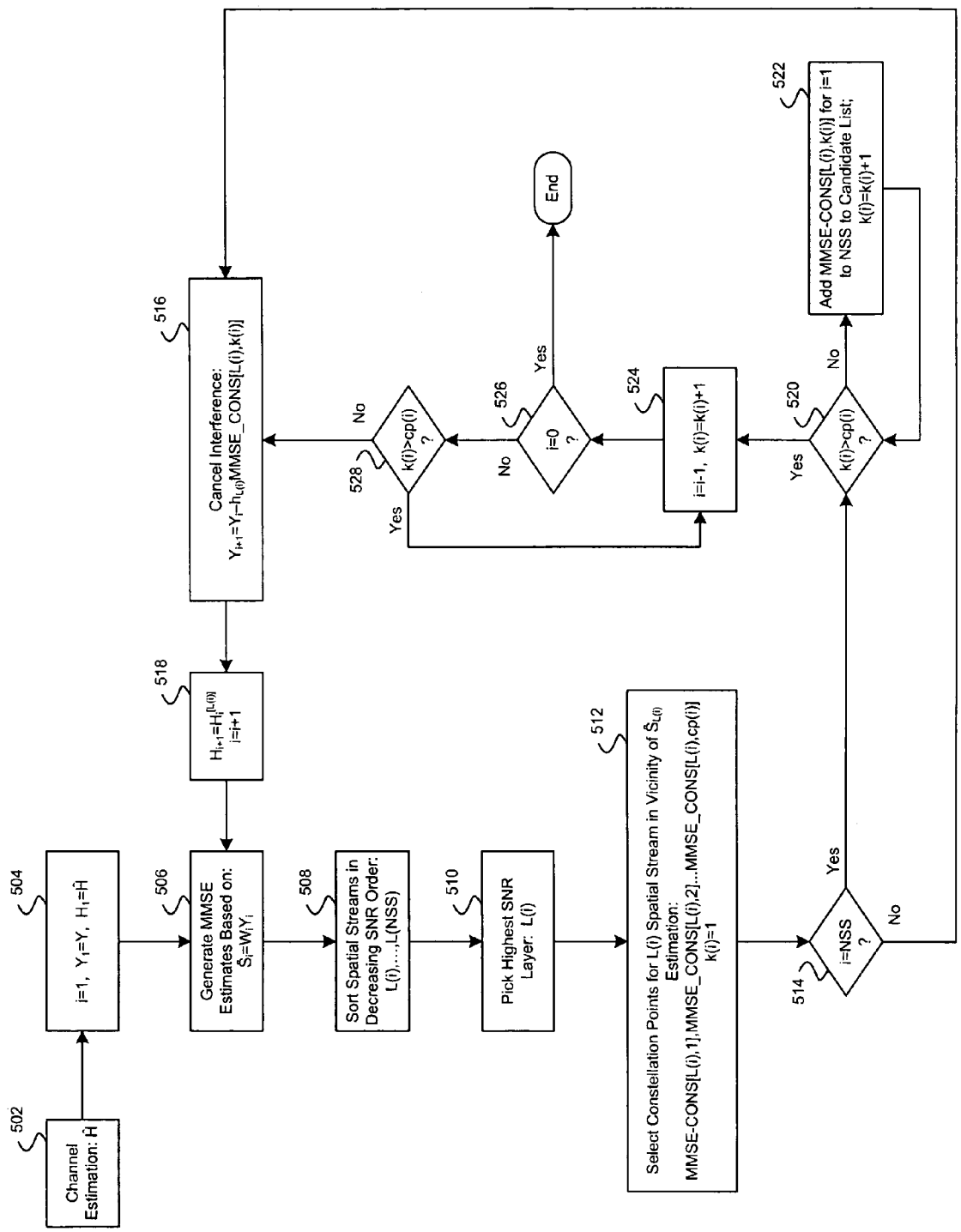
FIG. 5 is a flow chart illustrating exemplary steps for soft interference cancellation (SIC), in accordance with an embodiment of the invention.

FIG. 5 is a flow chart illustrating exemplary steps for soft interference cancellation (SIC), in accordance with an embodiment of the invention. Referring to FIG. 5, in step 502, a channel estimation, $\hat{H}$, may be computed. In step 504, variables may be initialized. The layer index i may indicate a layer, and may be initialized i=1 to indicate a first layer. The variable Y may refer to a received signal. The signal variable $Y_1$ may refer to a layer 1 signal, and may be initialized $Y_1=Y$. The initialization value of the signal variable $Y_1$ may indicate that, at initialization, no layers have been cancelled from the received signal. Consequently, the layer 1 signal variable $Y_1$ may be equal to the received signal Y. The received signal Y may be represented by a column vector Y. A layer channel estimation, $\hat{H}_i$, may refer to a channel estimate associated with current layer, and may be initialized $\hat{H}_i=\hat{H}$. The layer index, i, may refer to a layer as detected based on signals received by a plurality of receiving antennas 132, 134, . . . , 136, for example. In step 506, an MMSE estimation, $\hat{S}_i$, may be generated based on the column vector Y and on the layer channel estimation $\hat{H}_i$. The MMSE estimation may be represented, $\hat{S}_i=W_iY_i$, where the variable i may represent the current value for the layer index, and the variable $W_i$ may be computed from the MMSE equalization equation[5] for the layer i. The MMSE estimation $\hat{S}_i$ may be represented by a column vector. The column vector $\hat{S}_1$ may comprise a plurality of layers L(1), L(2), . . . , L(NSS) corresponding to a plurality of layers associated with transmitting antennas 112, 114, . . . , 116, for example.

In step 508, the spatial streams associated with the column vector $\hat{S}_i$ may be sorted according to a corresponding signal to noise ratio (SNR) value. For example, the spatial streams may be sorted in order of decreasing SNR value. In an exemplary sorted order, the layers may be sorted, L(i), . . . , L(NSS), where L(i) may be associated with the largest SNR value among the sorted layers, and L(NSS) may be associated with the smallest SNR value. The variable i may represent the current value for the layer index, for example during the first iteration in the flow chart, i=1. In step 510, the layer associated with the largest SNR value estimate may be selected. The selected layer may be L(i), for example. In step 512, a plurality of constellation points, associated with the layer L(i) may be selected. The plurality of constellation points may be in the vicinity of the corresponding MMSE estimation for the layer L(i), $\hat{S}_{L(i)}$. The plurality of constellation points may be represented MMSE-CONS[L(i),1], MMSE-CONS[L(i), 2], . . . , MMSE-CONS[L(i), cp(i)], where cp(i) may represent a number of constellation points selected. The constellation point index associated with layer L(i), k(i), may be initialized to a value k(i)=1.

Step 514 may determine if the layer index has reached the last of the plurality of NSS layers contained in the received signal Y. If step 514 has determined that the layer index has not reached the last of the plurality of NSS layers, in step 516, a subsequent signal variable $Y_{i+1}$ may be computed by cancelling interference from the signal variable $Y_i$. The interference, which may be cancelled, may be computed based on a selected constellation point, MMSE-CONS[L(i), k(i)], from among the plurality of constellation points associated with the layer L(i), and computed based on an L(i)$^{th}$ column from the channel estimation matrix $\hat{H}$, $\hat{h}_{L(i)}$. In step 518, and a subsequent layer channel estimate matrix $\hat{H}_{i+1}$ may be computed by removing the column corresponding to column vector $\hat{h}_{L(i)}$ from the current layer channel estimate matrix $\hat{H}_i$. The column vector, $\hat{h}_{L(i)}$, may represent a channel estimate associated with a layer L(i) that was transmitted by a corresponding transmitting antenna 112. In step 518, the layer index, i, may also be incremented. Step 506 may follow step 518. In step 506, that follows step 518, a subsequent MMSE estimation may be computed based on the subsequent layer channel estimate matrix, and on the subsequent signal variable.

If step 514 determines that the layer index has reached the last of the plurality of NSS layers, step 520, may determine if the current value for the constellation point index for the layer L(i), k(i), is greater than the value that indicates the total number of constellation points selected for the layer L(i), cp(i). If step 520 determines that the constellation point index is not greater than the total number of constellation points selected for the layer, in step 522, the constellation point MMSE-CONS[L(i), k(i)] may be added to a candidate list. The candidate list may comprise a set candidate vectors for which soft information may be computed. In step 522, the constellation point index may also be incremented. Step 520 may follow step 522.

If step 520 determines that the constellation point index is greater than the total number of constellation points selected for the layer, in step 524, the layer index, i, may be decremented, and the constellation point index associated with the current layer, k(i), may be incremented. Step 526 may determine if the current value for the layer index is equal to 0. If step 526 determines that the current value for the layer index is equal to 0, the process for constructing a candidate list may be completed. The process may therefore end.

If step 526 determines that the current value for the layer index is not equal to 0, step 528 may determine if the current value for the constellation point index for the current layer, k(i), is greater than the value that indicates the total number of constellation points selected for the layer cp(i). If step 528 determines that the value of k(i) is greater than the value of cp(i), step 524 may follow step 528. If step 528 determines that the value of k(i) is not greater than the value of cp(i), step 516 may follow step 528. In step 516, which follows step 528, the process of cancellation of interference and generation of MMSE estimates may continue.

Figure 6:
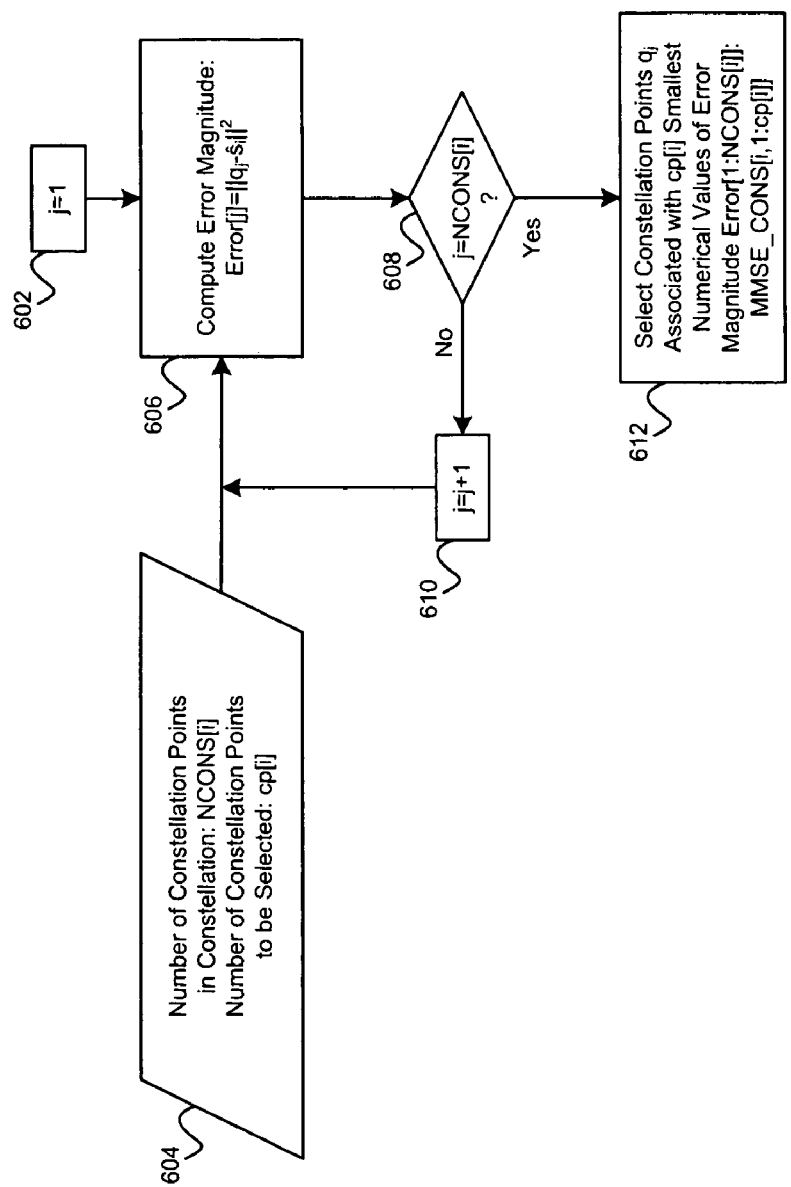
FIG. 6 is a flow chart illustrating exemplary steps in the selection of constellation points to be utilized in MMSE-SIC for a spatial stream comprising a symbol received by an antenna in accordance with an embodiment of the invention.

FIG. 6 is a flow chart illustrating exemplary steps in the selection of constellation points to be utilized in MMSE-SIC for a spatial stream comprising a symbol received by an antenna in accordance with an embodiment of the invention. Referring to FIG. 6, in step 602 a constellation point counter j may be set equal to 1. In step 604, a number of constellation points in a constellation map for a symbol received in an i$^{th}$ spatial stream by an n$^{th}$ receiving antenna may be determined. The number of selected constellation points may be indicated by the variable cp[i], and the total number of constellation points may be indicated by the variable NCONS[i]. In step 606 an error magnitude may be computed where $q_j$ may represent the j$^{th}$ constellation point in the constellation, and $\hat{s}_i$ may represent an estimated value for a transmitted symbol $s_i$ associated with the i$^{th}$ layer.

Step 608 may determine if the current constellation point is the last constellation point in the constellation map. If not, step 610 may increment the constellation point counter to reference a subsequent constellation point. Step 606 may follow. If step 608 determines that the current constellation point is the last constellation point in the constellation map, step 612 may select cp[i] number of constellation points with the smallest magnitude errors computed in step 606. The selected constellation points may be stored as constellation vector MMSE-CONS[i, 1 ,2, . . . cp[i]].

Various aspects of a method for minimum mean square error soft interference cancellation (MMSE-SIC) based sub-optimal maximum likelihood (ML) detection for a multiple input multiple output (MIMO) wireless system may comprise selecting at least one constellation point in a constellation map based on at least one of a plurality of received symbols. A number of the at least one constellation point may be less than or equal to a number of previously selected constellation points in a previous constellation map. At least one of the plurality of received symbols may be decoded based on the selected at least one constellation point.

Aspects of a system for MMSE-SIC based sub-optimal ML detection for a MIMO wireless system may comprise a detector that selects at least one constellation point in a constellation map based on at least one of a plurality of received symbols. A number of the at least one constellation point may be less than or equal to a number of previously selected constellation points in a previous constellation map. At least one of the plurality of received symbols may be decoded based on the selected at least one constellation point.

Another aspect of a method for MMSE-SIC based sub-optimal ML detection for a MIMO wireless system may comprise sorting a received RF signal into a plurality of layers based on an SNR, generating at least one estimated symbol based on one of the plurality of layers, and generating at least one cancellation signal resulting from canceling interference from the received RF signal based on each of the at least one estimated symbol. The aspect may further comprise generating at least one subsequent estimated symbol based on a subsequent one of the plurality of layers, and generating at least one subsequent cancellation signal resulting from canceling subsequent interference from each of the at least one cancellation signal based on each of the at least one subsequent estimated symbol. Soft information may be derived based on at least one estimated symbol, and the at least one subsequent estimated symbol. The received RF signal may be decoded based on the derived soft information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing received information in a wireless communication system, the method comprising:
   sorting a received RF signal in a multiple input multiple output (MIMO) system into a plurality of layers based on an SNR;
   generating at least one estimated symbol based on one of said plurality of layers, wherein said at least one estimated symbol is a minimum mean square error with linear equalization (MMSE-LE) estimate;
   generating at least one cancellation signal resulting from canceling interference from said received RF signal based on each of said at least one estimated symbol;
   generating at least one subsequent estimated symbol based on a subsequent one of said plurality of layers;
   generating at least one subsequent cancellation signal resulting from canceling subsequent interference from each of said at least one cancellation signal based on each of said at least one subsequent estimated symbol;
   deriving soft information based on said at least one estimated symbol, and said at least one subsequent estimated symbol; and
   decoding said received RF signal based on said derived soft information.

2. The method according to claim 1, comprising repeating said generating said at least one subsequent estimated symbol, and said generating at least one subsequent cancellation signal until said subsequent one of said plurality of layers is a last of said plurality of layers.

3. The method according to claim 2, comprising generating elements in a constellation vector based on a number of said at least one cancellation signals, and a number of said at least one subsequent cancellation signals for each said subsequent one of said plurality of layers.

4. The method according to claim 3, comprising computing at least one magnitude comprising a numerical difference between said received RF signal and at least one said element in said constellation vector.

5. The method according to claim 4, comprising computing at least one subsequent magnitude comprising a numerical difference between said received RF signal and a subsequent at least one said element in said constellation vector.

6. The method according to claim 5, comprising deriving said soft information based on a difference between a minimum said at least one magnitude, and a minimum said at least one subsequent magnitude.

7. The method according to claim 1, wherein said at least one estimated symbol is a constellation point in a constellation map.

8. The method according to claim 1, wherein said at least one subsequent estimated symbol is based on said cancelled interference.

9. A system for processing received information in a wireless communication system, the system comprising:
   one or more circuits that are operable to sort a received RF signal in a multiple input multiple output (MIMO) system into a plurality of layers based on an SNR;
   said one or more circuits are operable to generate at least one estimated symbol based on one of said plurality of layers, wherein said at least one estimated symbol is a minimum mean square error with linear equalization (MMSE-LE) estimate;
   said one or more circuits are operable to generate at least one cancellation signal resulting from canceling interference from said received RF signal based on each of said at least one estimated symbol;
   said one or more circuits are operable to generate at least one subsequent estimated symbol based on a subsequent one of said plurality of layers;
   said one or more circuits are operable to generate at least one subsequent cancellation signal resulting from canceling subsequent interference from each of said at least one cancellation signal based on each of said at least one subsequent estimated symbol;
   said one or more circuits are operable to derive soft information based on said at least one estimated symbol, and said at least one subsequent estimated symbol; and
   said one or more circuits are operable to decode said received RF signal based on said derived soft information.

10. The system according to claim 9, wherein said one or more circuits are operable to repeat said generating said at least one subsequent estimated symbol, and said generating at least one subsequent cancellation signal until said subsequent one of said plurality of layers is a last of said plurality of layers.

11. The system according to claim 10, wherein said one or more circuits are operable to generate elements in a constellation vector based on a number of said at least one cancellation signals, and a number of said at least one subsequent cancellation signals for each said subsequent one of said plurality of layers.

12. The system according to claim 11, wherein said one or more circuits are operable to compute at least one magnitude comprising a numerical difference between said received RF signal and at least one said element in said constellation vector.

13. The system according to claim 12, wherein said one or more circuits are operable to compute at least one subsequent magnitude comprising a numerical difference between said received RF signal and a subsequent at least one said element in said constellation vector.

14. The system according to claim 13, wherein said one or more circuits are operable to derive said soft information based on a difference between a minimum said at least one magnitude, and a minimum said at least one subsequent magnitude.

15. The system according to claim 9, wherein said at least one estimated symbol is a constellation point in a constellation map.

16. The system according to claim 9, wherein said at least one subsequent estimated symbol is based on said cancelled interference.

* * * * *